April 29, 1930.  F. L. HUTCHINSON  1,756,688
AUTOMATIC FLUID TEMPERATURE CONTROL VALVE
Filed Sept. 19, 1927
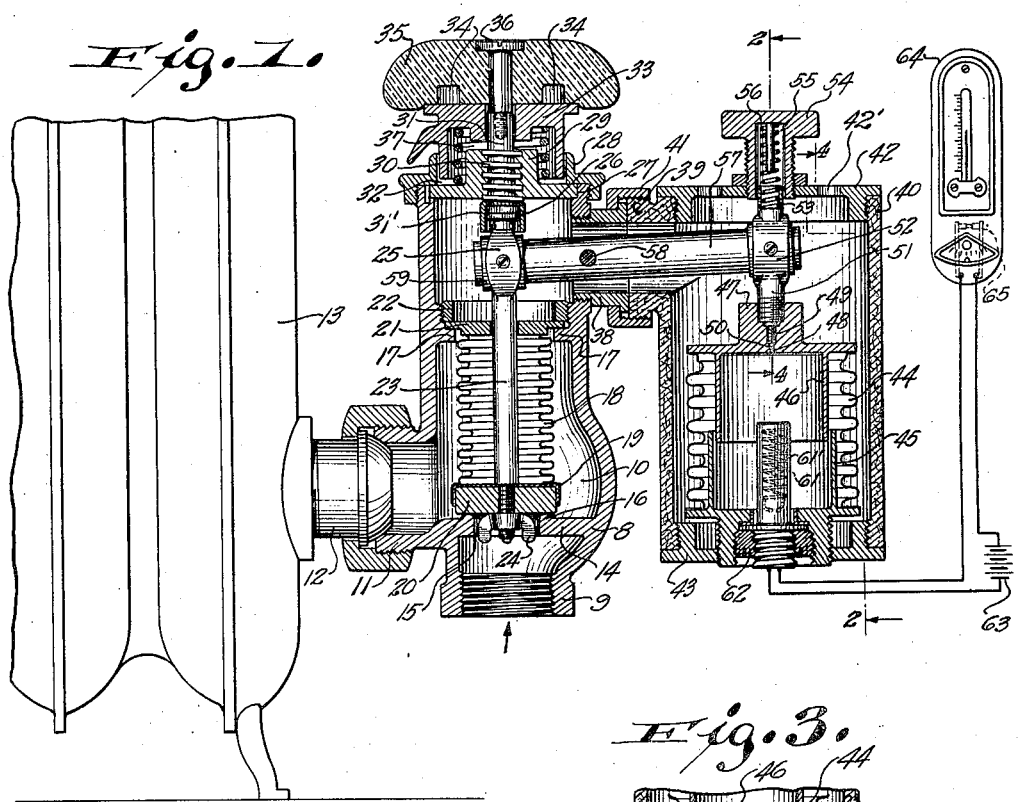
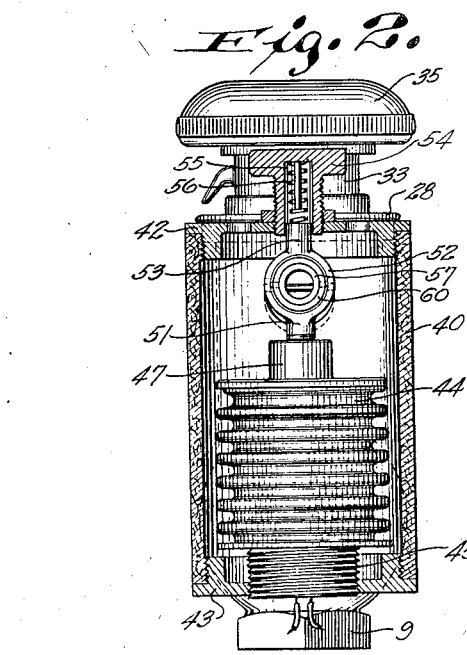
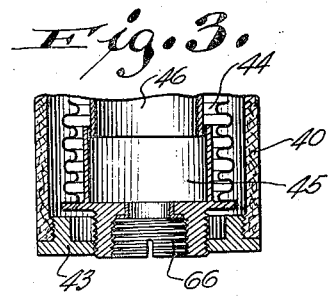
INVENTOR.
Frank L. Hutchinson,
BY
Morsell, Keeney & Morsell
ATTORNEYS.

Patented Apr. 29, 1930

1,756,688

UNITED STATES PATENT OFFICE

FRANK L. HUTCHINSON, OF WAUWATOSA, WISCONSIN

AUTOMATIC FLUID-TEMPERATURE-CONTROL VALVE

Application filed September 19, 1927. Serial No. 220,591.

This invention relates to improvements in automatic fluid temperature control valves.

Automatic control valves for radiators, which have heretofore been used, have been so designed that the expansion unit is affected directly by the room temperature near the radiator. While this type of valve will perform its function very well in a room of average size, still when it is used in a very large room such as an auditorium, it will be found that the temperature of that portion of the room most remote from the radiator will become very low before the automatic valve will operate to admit the heating fluid to the radiator. This would be caused by the fact that the thermal unit of the automatic valve is adjacent to the radiator, and so is more affected by the temperature of that portion of the room than by the temperature of a remote portion.

It is one of the objects of the present invention to provide an automatic fluid temperature control valve, the thermal unit of which may be controlled either by the temperature of the room near the radiator, or by the temperature of any other portion of the room, whichever seems most desirable under the circumstances and according to the size of the room in which it is to be used.

It is a more specific object of this invention to provide an automatic fluid temperature control valve, the thermal unit of which may be controlled by an ordinary thermostat located in any desired position.

It is a further object of this invention to provide an automatic fluid temperature control valve, having a heating coil for use in combination with an ordinary thermostat which may be readily inserted within the thermal unit of the valve when it is desired to use the thermostat as a control.

It is a further object of this invention to provide an automatic fluid temperature control valve having an improved lever arrangement between the thermal unit and the valve stem.

It is a further object of this invention to provide an automatic fluid temperature control valve in which the expansion member operates against an automatic adjustable tension spring.

It is a further object of this invention to provide an automatic fluid temperature control valve having guides for directing straight movement of the expansion member.

It is a further object of this invention to provide an automatic fluid temperature control valve which is simple in construction and operation, and is well adapted for the purpose described.

With the above and other objects in view, the invention consists of the improved automatic temperature control valve, and all its parts and combinations as set forth in the claims and all equivalents thereof.

In the accompanying drawing, in which the same reference characters designate the same parts in all of the views:

Fig. 1 is a vertical sectional view of the improved automatic temperature control valve in attachment with a radiator, and in combination with an ordinary thermostat;

Fig. 2 is a sectional view taken on line 2—2 of Fig. 1;

Fig. 3 is a broken away sectional view of the lower portion of the thermal unit and casing, showing the thermostatically controlled heating coil replaced by a plug; and Fig. 4 is a sectional view taken on line 4—4 of Fig. 1.

Referring to the drawing, the numeral 8 indicates the main casing of the valve, having a depending coupling portion 9 adapted to be secured to a fluid supply pipe. The coupling portion 9 opens into a chamber 10, from which extends laterally another coupling portion 11, adapted to be secured to a pipe 12 communicating with a heating radiator 13. The casing 8, near the opening from the portion 9, is formed with a partition 14 having a central opening 15 on the upper side of the partition, and surrounding the opening is an annular rib 16 forming a valve seat.

Within the casing 8, between its upper and lower ends, an internal annular rib 17 is formed. A bellows member 18 has its lower end secured to an inverted cup shaped disk holding member 19, within which a valve disk 20 is positioned. The upper end of the bellows member is secured to a flanged disk 21, the flanges of which rest upon the annular rib 17 of the casing 8. A lock nut 22, having exterior threads, fits within complementary threads on the inside of the casing to lock the flanged disk 21 in place upon the annular rib 17. This forms a packless partition and effectively prevents leakage of the steam into the upper portion of the casing 8.

A valve rod 23 extends vertically within the casing 8 and carries at its lower end the valve disk 20, the latter controlling the valve opening 15 and seating on the annular rib 16. The valve rod extends through an opening in the flanged disk into the bellows member. The lower portion of the rod is threaded and of smaller diameter and extends through registering openings in the disk holding member 19 and disk 20. A winged nut 24 is threaded on the lower end of the rod, thereby clamping the valve disk to the disk holding member, and also acting as a guide into the valve opening.

The upper portion of the valve rod is formed with an enlarged ring-shaped pivot portion 25, and the extreme upper end is formed with a flanged head 26. Clamped in an annular seat 27 in the upper portion of the casing 8 by means of a cover 28 screwed onto the casing end portion, is a disk member 29 having an enlarged mid-portion which is bored and internally threaded, and through which a worm 30 on the turning member 31 is threaded. The cover 28 is formed with a central opening of considerably greater diameter than the diameter of the enlarged mid-portion of the disk member 29, leaving an annular space 32 therebetween. Within this space an inverted cup-shaped member 33, having a central bore and having lugs 34 on its upper surface, is received. These lugs extend into sockets in a hand wheel 35. The hand wheel is secured to the turning member 31 by a threaded bolt 36. Within the annular space 32, and between the inner wall of the inverted cup-shaped member 33 and the mid-portion of the disk 29 is a spring 37. The lower end of the turning member 31 is formed with a valve rod engaging member 31'. The latter member, which is in the shape of an inverted cup, engages the head 26 of the valve rod, and is free to turn around the same, causing the rod to be depressed and permitting manual control of the valve by means of the hand wheel 35. The hand wheel operates against the tension of the spring 37.

Threaded into the side of the upper portion of the casing 8 is a tubular extension 38 having a flanged outer end. The extension 38 is clamped to a threaded extension 39 of an auxiliary casing 40 by means of a lock nut 41 engaging the flange of the extension 38 and the threads of the extension 39. The casing 40 is of cylindrical form and is closed at its upper and lower ends by covers 42 and 43 threaded thereinto, the cover 42 being provided with a plurality of air vents or apertures 42'.

Contained within the casing 40 is an expansible member 44 which is filled with a volatile fluid easily influenced by temperature changes. The lower portion of the expansible member is secured to a cylindrical shell 45 which is threaded into the lower cover 43. The upper portion of the expansible member is secured to an inverted shell 46 of lesser diameter than the shell 45 so that when the member 44 expands or contracts the shell 46 will slide within the shell 45 and guide the vertical movement of the expansible member.

The closed end of the shell 46 is formed with a medial extension 47 within which is a filling opening 48 for the volatile liquid. The opening has an enlarged upper portion for receiving a screw 49. At the lower end of the screw is a lead shot 50 to normally close the opening. Threaded into the extension 47 above the screw is a pivot member 51 having an intermediate enlarged ring-shaped portion 52, and at its upper end a socket 53. A turning member 54 having a socket 55 is threaded into the cover 43 of the casing 40. A spring 56 has one end received by the socket 55 and the other end by the socket 53 of the pivot member. By means of the turning member 54 and the spring 56 the exact amount of tension which is necessary upon the expansion member may be obtained, and once obtained the spring acts as an automatic control. This feature is an important one, as a very delicate adjustment is necessary.

A lever 57 is fulcrumed on a pin 58, and has its inner end in a sleeve 59 which is pivoted within the ring-shaped member 25 of the valve rod. The outer end of the lever is held in a similar sleeve 60 pivoted in the ring-shaped member 52.

A heating element comprising a coil 61 wound on an insulator, and an outer casing 61', has a lock nut 62 threaded on the lower end thereof by which the element is threaded into the enclosed end of the shell 45. The heating coil is operated by dry cells 63, or by a transformer connected to the house current. The contact for the heating coil is made or broken by an ordinary thermostat 64 having contacts 65 which expand or contract according to the temperature of the room. When it is not desired to use the heating coil, a plug 66, illustrated in Fig. 3, is inserted in its place.

The auxiliary casing 40 is constructed preferably of fibre to eliminate all chance of conductivity of heat from the radiator.

The operation of the device is as follows: When it is desired to use the device in a large room, the expansion member is filled with a liquid which expands at a temperature considerably higher than room temperature, for example, 150° Fahrenheit. The thermostat 64 is placed in any desired position. In Fig. 1, the position of the parts is such that the valve is closed, the temperature of the room is normal, and the contact points 65 of the thermostat are in an expanded position causing a contact to be made. The heating coil is glowing, and maintaining a temperature of 150° or more within the expansion member. This maintains the member 44 in an expanded position, and through the lever arrangement, keeps the valve closed. When the temperature of the room drops below the desired standard, the contact points 65 on the thermostat contract and open the circuit. This shuts off the heating coil and allows the volatile liquid to cool and contract, thereby opening the radiator valve and admitting steam. When the room temperature reaches the desired point, the thermostatic contacts 65 once more expand and close the circuit. This causes the heating coil to glow and expand the member 44, closing the radiator valve. By this arrangement the valve is operated independently of the temperature of the room near the radiator, and will work perfectly in a room of any size.

When the device is to be used in a small room, it is not necessary to use the heating coil, and the latter is replaced by the plug as shown in Fig. 3. The expansible member must then be refilled with a liquid, which expands at a lower temperature such as 70° Farenheit. When the device is used in this form, the liquid within the expansible member is affected directly by the room temperature near the radiator.

While I have described the invention more particularly for use in connection with radiator valves, it is not desired to limit the invention to this particular adaptation. The broad concept of the invention contemplates its use for controlling valves generally. By use of this invention, the temperature of a fluid in a container may be regulated by inserting the proper form of thermostat in the container and by using the automatic valve in connection with the container and the thermostat.

From the foregoing description, it may be seen that the improved automatic fluid temperature control valve is simple in construction and operation, and is well adapted for the purpose described.

What I claim is:

1. A valve for fluid radiators, comprising a main casing having a fluid opening, a valve member controlling said opening, a valve rod extending through the main casing having an enlarged ring-shaped opening in one portion thereof, a turning member having an inverted cup-shaped lower end portion engaging the upper end of the valve rod, an auxiliary casing connected with the main casing, a thermostatically expansible member within the auxiliary casing having an extension with an enlarged ring-shaped opening, a lever having an intermediate fulcrum and having one end pivoted in each of the aforementioned ring-shaped openings, and adjustable yielding means in connection with the thermostatically expansible member.

2. A valve for fluid radiators, comprising a main casing having a fluid opening, a valve member controlling said opening, a valve rod extending through the main casing having a lever seat in one portion thereof, a turning member engageable with the upper end of the valve rod, an auxiliary casing connected with the main casing, said two casings having communicating openings, a thermostatically expansible member within the auxiliary casing having an extension, a lever seat in said extension, a lever extending through the openings between the two casings and having an intermediate fulcrum and having one end positioned in each of the aforementioned lever seats, and adjustable yielding means in connection with the thermostatically expansible member.

3. A valve for fluid heated radiators comprising a two-part casing, there being a fluid opening in one casing portion, a valve member controlling said opening, thermostatic operating means within the other casing portion, and means between said thermostatic operating means and the valve member for actuating the latter, said casing for the thermostatic operating means being constructed of a non-heat-conducting material to prevent the thermostatic operating means from being affected by heat radiated and conducted from the heated fluid.

4. A valve for fluid radiators comprising a main casing having a fluid opening, a valve member controlling said opening, a valve rod within the main casing having a lever seat in one portion thereof, a turning member engageable with said valve rod, an auxiliary casing connected with the main casing, said two casings having communicating openings, a thermostatically expansible member within the auxiliary casing having an extension, a lever seat in said extension, a lever extending through the openings between the two casings and having an intermediate fulcrum and having one end positioned in each of the aforementioned lever seats, and means for yieldingly adjusting the thermostatically expansible member.

5. A valve for fluid radiators comprising a main casing having a fluid opening, a valve member controlling said opening, a valve rod within the main casing, an auxiliary casing connected with the main casing, said two casings having communicating openings, a thermostatically expansible member within the auxiliary casing having an extension, a lever extending through the openings between the two casings and having an intermediate fulcrum and having its ends pivotally engaging the valve rod and the extension of the expansible member, and means for yieldingly adjusting the thermostatically expansible member.

In testimony whereof, I affix my signature.

FRANK L. HUTCHINSON.